United States Patent
Cobb et al.

(10) Patent No.: US 8,493,409 B2
(45) Date of Patent: Jul. 23, 2013

(54) VISUALIZING AND UPDATING SEQUENCES AND SEGMENTS IN A VIDEO SURVEILLANCE SYSTEM

(75) Inventors: Wesley Kenneth Cobb, The Woodlands, TX (US); Bobby Ernest Blythe, Houston, TX (US); David Samuel Friedlander, Houston, TX (US); Rajkiran Kumar Gottumukkal, Houston, TX (US); Kishor Adinath Saitwal, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 815 days.

(21) Appl. No.: 12/543,351

(22) Filed: Aug. 18, 2009

(65) Prior Publication Data
US 2011/0043536 A1 Feb. 24, 2011

(51) Int. Cl.
G09G 5/14 (2006.01)
G06T 17/05 (2011.01)
G06T 15/04 (2011.01)
G06T 11/00 (2006.01)
G06T 15/08 (2011.01)

(52) U.S. Cl.
CPC ............... *G06T 17/05* (2013.01); *G06T 15/04* (2013.01); *G06T 11/00* (2013.01); *G06T 15/08* (2013.01)
USPC ........... 345/629; 345/619; 345/419; 345/581; 345/420; 345/633

(58) Field of Classification Search
CPC G06T 17/05; G06T 15/04; G06T 11/00; G06T 11/001; G06T 15/08; G06T 15/405; G06T 19/003; G06T 2207/20144
USPC .................. 345/629, 619, 419, 581, 420, 633
See application file for complete search history.

(56) References Cited

U.S. PATENT DOCUMENTS

| | | | |
|---|---|---|---|
| 4,679,077 A | 7/1987 | Yuasa et al. | |
| 5,113,507 A | 5/1992 | Jaeckel | |
| 5,748,775 A | 5/1998 | Tsuchikawa et al. | |

(Continued)

FOREIGN PATENT DOCUMENTS

WO 2009049314 A2 4/2009

OTHER PUBLICATIONS

"Adaptive Resonance Theory" Gail A. Carpenter and Stephen Grossberg Department of Cognitive and Neural Systems The Handbook of Brain Theory and Neural Networks, Second Edition Michael A. Arbib, Editor Cambridge, Massachusetts: MIT Press Submitted: Sep. 1998.*

(Continued)

*Primary Examiner* — Javid A Amini
(74) *Attorney, Agent, or Firm* — Patterson & Sheridan LLP (57) ABSTRACT

Techniques are disclosed for visually conveying a sequence storing an ordered string of symbols generated from kinematic data derived from analyzing an input stream of video frames depicting one or more foreground objects. The sequence may represent information learned by a video surveillance system. A request may be received to view the sequence or a segment partitioned form the sequence. A visual representation of the segment may be generated and superimposed over a background image associated with the scene. A user interface may be configured to display the visual representation of the sequence or segment and to allow a user to view and/or modify properties associated with the sequence or segment.

18 Claims, 7 Drawing Sheets

U.S. PATENT DOCUMENTS

| | | | |
|---|---|---|---|
| 5,751,378 A | | 5/1998 | Chen et al. |
| 5,969,755 A | | 10/1999 | Courtney |
| 6,252,974 B1 | | 6/2001 | Martens et al. |
| 6,263,088 B1 | | 7/2001 | Crabtree et al. |
| 6,405,975 B1* | | 6/2002 | Sankrithi et al. .............. 244/1 R |
| 6,570,608 B1 | | 5/2003 | Tserng |
| 6,661,918 B1 | | 12/2003 | Gordon et al. |
| 6,674,877 B1 | | 1/2004 | Jojic et al. |
| 6,678,413 B1 | | 1/2004 | Liang et al. |
| 6,856,249 B2 | | 2/2005 | Strubbe et al. |
| 6,940,998 B2 | | 9/2005 | Garoutte |
| 7,076,102 B2 | | 7/2006 | Lin et al. |
| 7,136,525 B1 | | 11/2006 | Toyama et al. |
| 7,158,680 B2 | | 1/2007 | Pace |
| 7,200,266 B2 | | 4/2007 | Ozer et al. |
| 7,227,893 B1 | | 6/2007 | Srinivasa et al. |
| 7,436,887 B2 | | 10/2008 | Yeredor et al. |
| 7,630,517 B2* | | 12/2009 | Mirowski et al. .............. 382/109 |
| 7,825,954 B2 | | 11/2010 | Zhang et al. |
| 7,836,050 B2* | | 11/2010 | Jing et al. ...................... 707/728 |
| 7,868,912 B2 | | 1/2011 | Venetianer et al. |
| 2003/0107650 A1 | | 6/2003 | Colmenarez et al. |
| 2004/0031406 A1* | | 2/2004 | Otake et al. ................... 101/129 |
| 2004/0033090 A1* | | 2/2004 | Yamanaka et al. ............ 399/301 |
| 2004/0151342 A1 | | 8/2004 | Venetianer et al. |
| 2004/0220724 A1* | | 11/2004 | Hahn et al. .................... 701/200 |
| 2005/0001759 A1 | | 1/2005 | Khosla |
| 2005/0105765 A1 | | 5/2005 | Han et al. |
| 2005/0240629 A1 | | 10/2005 | Gu et al. |
| 2006/0018516 A1 | | 1/2006 | Masoud et al. |
| 2006/0152532 A1* | | 7/2006 | Sen ................................ 345/629 |
| 2006/0165386 A1 | | 7/2006 | Garoutte |
| 2006/0190419 A1 | | 8/2006 | Bunn et al. |
| 2006/0222206 A1 | | 10/2006 | Garoutte |
| 2006/0267783 A1* | | 11/2006 | Smith ........................... 340/601 |
| 2007/0066916 A1* | | 3/2007 | Lemos .......................... 600/558 |
| 2007/0086633 A1* | | 4/2007 | Boese et al. ................... 382/128 |
| 2007/0140438 A1* | | 6/2007 | Horndler et al. .............. 378/207 |
| 2008/0002856 A1 | | 1/2008 | Ma et al. |
| 2008/0181453 A1 | | 7/2008 | Xu et al. |
| 2008/0181499 A1 | | 7/2008 | Yang et al. |
| 2008/0193010 A1 | | 8/2008 | Eaton et al. |
| 2008/0219537 A1* | | 9/2008 | Matsue et al. ................. 382/131 |
| 2008/0240496 A1 | | 10/2008 | Senior |
| 2008/0252723 A1 | | 10/2008 | Park |
| 2008/0267490 A1* | | 10/2008 | Gorges et al. ................. 382/154 |
| 2008/0281335 A1* | | 11/2008 | Fell ................................ 606/130 |
| 2009/0022364 A1 | | 1/2009 | Swaminathan et al. |
| 2009/0063557 A1* | | 3/2009 | MacPherson ............. 707/103 R |
| 2009/0067716 A1 | | 3/2009 | Brown et al. |
| 2009/0210367 A1 | | 8/2009 | Armstrong et al. |
| 2009/0297023 A1 | | 12/2009 | Lipton et al. |
| 2009/0324107 A1 | | 12/2009 | Walch |
| 2010/0063949 A1 | | 3/2010 | Eaton et al. |
| 2010/0331855 A1* | | 12/2010 | Zhao et al. .................... 606/130 |
| 2012/0109358 A1* | | 5/2012 | Goldman et al. ............. 700/138 |

OTHER PUBLICATIONS

"Segmentation and Tracking of Multiple Humans in Crowded Environments" Tao Zhao, Member, IEEE, Ram Nevatia, Fellow, IEEE, and Bo Wu, Student Member, IEEE; IEEE Transactions on Pattern Analysis and Machine Intelligence, vol. 30, No. 7, Jul. 2008.*

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

VISUALIZING AND UPDATING SEQUENCES AND SEGMENTS IN A VIDEO SURVEILLANCE SYSTEM

BACKGROUND OF THE INVENTION

1. Field of the Invention

Embodiments of the invention provide techniques for conveying information learned by a video surveillance system. More specifically, embodiments of the invention relate to techniques for visualizing and updating kinematic segments in a video surveillance system.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "abnormal" behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY OF THE INVENTION

One embodiment of the invention includes a computer-implemented method. The method may generally include receiving a request to view a sequence storing an ordered string of symbols, wherein the sequence is generated from kinematic data derived from analyzing an input stream of video frames depicting one or more foreground objects; retrieving a background image associated with a scene depicted in the input stream of video frames; generating a visual representation of the requested sequence; and superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

Another embodiment of the invention includes a computer-readable storage medium containing a program which, when executed by a computer processor, performs an operation. The operation may generally include receiving a request to view a sequence storing an ordered string of symbols, wherein the sequence is generated from kinematic data derived from analyzing an input stream of video frames depicting one or more foreground objects; retrieving a background image associated with a scene depicted in the input stream of video frames; generating a visual representation of the requested sequence; and superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

Still another embodiment of the invention includes a system. The system may include a video input source configured to provide a sequence of video frames, each depicting a scene, a processor and a memory containing a program. The program, when executed by the processor, is configured to perform an operation. The operation may generally include receiving a request to view a sequence storing an ordered string of symbols, wherein the sequence is generated from kinematic data derived from analyzing an input stream of video frames depicting one or more foreground objects; retrieving a background image associated with a scene depicted in the input stream of video frames; generating a visual representation of the requested sequence; and superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide an interface configured to visually convey information learned by a behavior-recognition system. The behavior-recognition system may be configured to identify, learn, and recognize patterns of behavior by observing and evaluating events depicted by a sequence of video frames. In a particular embodiment, the behavior-recognition system may include both a computer vision engine and a machine learning engine. The computer vision engine may be configured to evaluate a stream of video frames. Typically, each frame of video may be characterized using multiple color (or grayscale) channels (e.g., a radiance value between 0-255 and a set of red, green, and blue (RGB) color channels values, each between 0-255). Further, the computer vision engine may generate a background image by observing the scene over a number of video frames. For example, consider a video camera trained on a stretch of a highway. In such a case, the background would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine may compare the pixel values for a given frame with the background image and identify objects as they appear and move about the scene. Typically, when a region of the scene (referred to as a "blob" or "patch") is observed with appearance values that differ substantially from the background image, that region is identified as depicting a foreground object. Once identified, the object may be evaluated by a classifier configured to determine what is depicted by the foreground object (e.g., a vehicle or a person). Further, the computer vision engine may identify features (e.g., height/width in pixels, average color values, shape, area, and the like) used to track the object from frame-to-frame. Further still, the computer vision engine may derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames. Each context event may provide kinematic data related to a foreground object observed by the computer vision engine in the sequence of video frames.

Data output from the computer vision engine may be supplied to the machine learning engine. In one embodiment, the machine learning engine may evaluate the context events to generate "primitive events" describing object behavior. Each primitive event may provide semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," "vehicle turns," "vehicle slowing," and "vehicle stops" (once the kinematic information about the car indicated a speed of 0). As events occur, and re-occur, the machine learning engine may create, encode, store, retrieve, and reinforce patterns representing the events observed to have occurred, e.g., long-term memories (or long-term "percepts") representing a higher-level abstraction of a car parking in the scene—generated from the primitive events underlying multiple observations of different cars entering and parking. The interface may be configured to visually convey such patterns. Specifically, the patterns may be stored in a long-term memory of the machine learning engine. Further still, patterns representing an anomalous event (relative to prior observation) or events identified as an event of interest may result in alerts passed to users of the behavioral recognition system.

In one embodiment, the machine learning engine may generate kinematic data describing behavior of a foreground object in a scene. Suppose the computer vision engine observes a car pulling up, parking, and a driver of the car exiting the car and walking. In response, the machine learning engine may generate a sequence that includes "vehicle appears," "vehicle slowing," "vehicle stops," "human appears," "human starts," and "human moving." Of course, the sequence of kinematic data may be arbitrary symbols. For example, in one embodiment, a voting experts technique is used to generate segments from a sequence of symbols assigned to clusters of an adaptive resonance theory (ART) network. The ART network itself may cluster nodes of a self-organizing map (SOM). Further, the SOM may be created by mapping inputs of kinematic data derived from observations of the computer vision engine monitoring agents moving about the scene (e.g., a person or a vehicle moving within the field of vision of the camera). However, for purposes of readability, kinematic data is sometimes described herein using the agent-action approach used above (e.g., "person moving").

In one embodiment, the machine-learning engine may partition the sequence into segments. For example, the machine-learning engine may partition the sequence into a first segment and a second segment. For instance, in the parking scenario described above, the first segment may include kinematic data describing the car pulling up and parking (e.g., "vehicle appears," "vehicle slowing," and "vehicle stops"). The second segment may include kinematic data describing the driver exiting the car and walking (e.g., "human appears," "human starts," and "human moving"). Consequently, the machine learning engine may evaluate each segment individually. Further, combinations of sequences and segments may be evaluated against prior observations to detect anomalous events.

In one embodiment, a voting experts approach may be used to generate the segments from a sequence of kinematic data. The voting experts approach provides an unsupervised induction-learning technique used for segmenting sequences into segments. In particular, the voting experts approach computes statistical signatures of different-length segments in a set of sequences and identifies the most probable segments in the sequences, based on the statistical signatures. The voting experts identify segments having low internal entropies (a measure of randomness), while also maximizing entropies at boundaries between segments.

As stated, the video surveillance system may be configured to identity anomalous segments. More specifically, the video surveillance system uses inductive reasoning to identify general patterns of behavior (as represented by the observed sequence labels) to estimate a probability density function for different activities (representing the statistical likelihood of a given segment being observed). Doing so allows the video surveillance system to generate an alert when an intra-trajectory observed segment does not satisfy the estimated normal-activity statistics. Similarly, the video surveillance system may also generate alerts for inter-trajectory observations that do not satisfy the estimated normal-activity statistics for interactions between the sequences of different objects.

In one embodiment, the machine-learning engine may also include a transaction server. The transaction server may generate a visual representation of sequences of agent behavior, as well of how the machine learning engine segmented a particular sequence. Further, the transaction server may generate a visualization of sequences (or segments) identified as being anomalous, relative to the sequences (and segments) of other agents observed by the computer vision engine to have engaged in the same (or similar behavior). Thus, the transaction server allows users to explore data learned by the machine-learning engine. Further, the transaction server allows users to specify how the system is to respond to certain observed events and/or behaviors (for example, when to produce (or not produce) an alert). For instance, the transaction server may receive a request to view a segment—or a request to view segments for a particular agent (e.g., for a person). In response, the transaction server may generate a visual representation of the segment superimposed over a background model. The background model provides an image of the scene expected when the background is visible to the camera. Alternatively, the transaction server may also transmit learned data to a client application. The client application may generate a visual representation of the segment from the learned data. Further, the transaction server may also receive user requests to associate metadata with a segment. The metadata may be used to guide system behavior. For example, a user may provide a name for a segment, specify a rule that the system should generate an alert (or refrain from generating an alert) when a sequence of events that match a segment is observed, or otherwise modify metadata associated with a segment.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
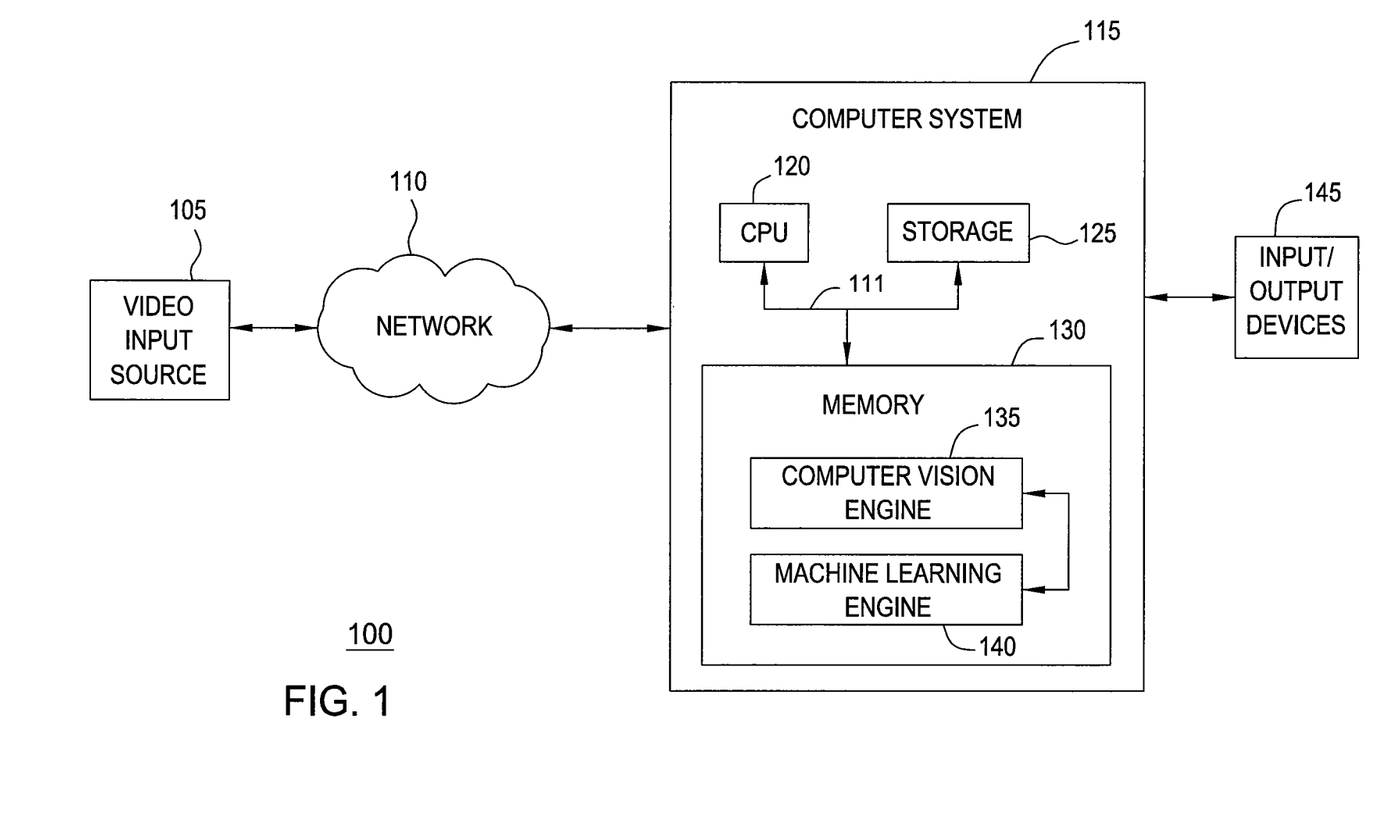
FIG. 1 illustrates components of a video analysis and behavior-recognition system, according to one embodiment of the invention.

FIG. 1 illustrates components of a video analysis and behavior-recognition system 100, according to one embodiment of the invention. As shown, the behavior-recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 may provide software applications configured to analyze a sequence of video frames provided by the video input source 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like. Additionally, although shown as a single video input source 105, the system 100 may support many video cameras—each observing a distinct scene. Further, each camera may have multiple preset positions (i.e., a single camera may, in fact, be trained on more than one scene). In such cases, a separate instance of the computer vision engine 135 and machine learning-engine 140 may be available to observe the video stream from each camera (and presets, if any).

The computer vision engine 135 may be configured to analyze this raw information to identify active objects in the video stream, classify the objects, derive a variety of metadata regarding the actions and interactions of such objects, and supply this information to a machine-learning engine 140. In turn, the machine-learning engine 140 may be configured to evaluate, observe, learn, and remember details regarding events (and types of events) that transpire within the scene over time.

In one embodiment, the machine-learning engine 140 receives the video frames and the data generated by the computer vision engine 135. The machine-learning engine 140 may be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is may be provided to output devices 118 to issue alerts, for example, an alert message presented on a GUI screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application running on another computer system may request (or receive) the results of over network 110.

Figure 2:
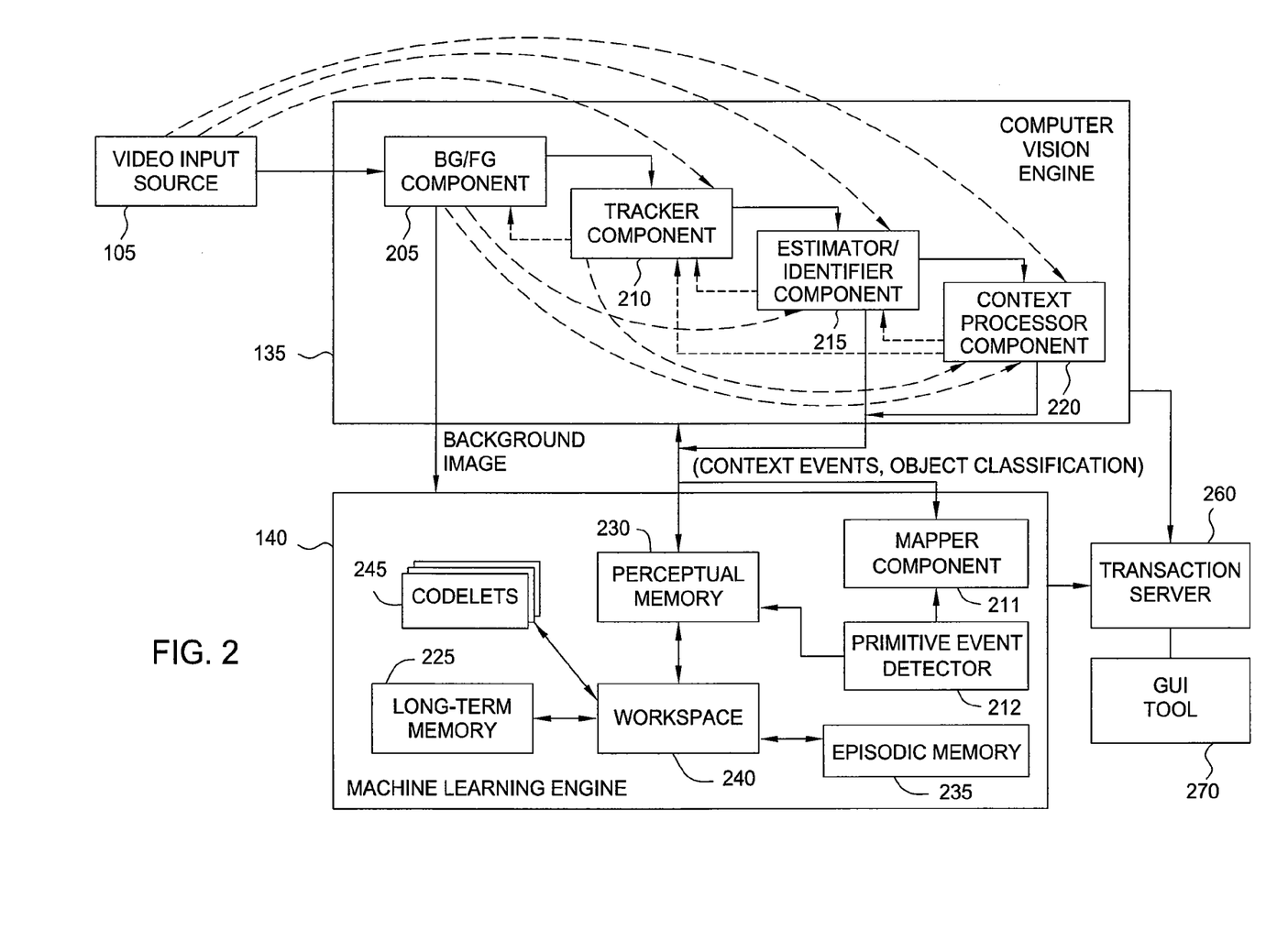
FIG. 2 further illustrates components of a computer vision engine and a machine-learning engine, according to one embodiment of the invention.

FIG. 2 further illustrates components of the computer vision engine 135 and the machine-learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows) as well as to the machine-learning engine 140. In one embodiment, the components 205, 210, 215, and 220 may each provide a software module configured to provide the functions described herein.

Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channel or radiance channel for black and white video). In one embodiment, the BG/FG component 205 may model the background states for each pixel using a corresponding ART network. In such a case, mature clusters in the art network for a given pixel may represent a distinct background state for the scene being observed. That is, each mature cluster may represent a pixel color value (and mean and variance from that value) expected to be observed in a frame of video when the background of the scene is visible to the camera. Typically, a cluster in the ART network is "mature" after a specified number of inputs have been mapped to that pixel. For example, consider a camera fixed on an elevator lobby. An ART network corresponding to a pixel could steadily fluctuate between a pixel color value obtained when an elevator door was closed and one when it was open—with other colors transiently being observed as agents (people) move about the scene. This could result in an ART network with two mature clusters (one modeling the color values when the elevator door is closed and one modeling when it is open). In this manner, each pixel may be classified as depicting scene foreground or scene background (from frame-to-frame) using an ART network modeling a given pixel.

Additionally, the BG/FG component 205 may be configured to generate a mask used to identify which pixels of the scene are classified as depicting foreground and, conversely, which pixels are classified as depicting scene background. The BG/FG component 205 then identifies regions of the scene that contain a portion of scene foreground (referred to as a foreground "blob" or "patch") and supplies this information to subsequent stages of the pipeline. In one embodiment, a patch may be evaluated over a number of frames before being forwarded to other components of the computer vision engine 135. For example, the BG/FG component 205 may evaluate features of a patch from frame-to-frame to make an initial determination that the patch depicts a foreground agent in the scene as opposed to simply a patch of pixels classified as foreground due to camera noise or changes in scene lighting. Additionally, pixels classified as depicting scene background maybe used to a background image modeling the scene.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object. In an alternative embodiment, the machine learning engine 140 may classify foreground objects observed by the vision engine 135. For example, the machine-learning engine 140 may include an unsupervised classifier configured to observe and distinguish among different agent types (e.g., between people and vehicles) based on a plurality of micro-features (e.g., size, speed, appearance, etc.).

The context processor component 220 may receive the output from other stages of the pipeline (i.e., the tracked objects, the background and foreground models, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140. In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," "person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a binary ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene.

Further, both the computer vision engine 135 and the machine learning engine 140 may interface with a transaction server 260 and a GUI tool 270 to allow users to explore data learned by the machine-learning engine 140, according to one embodiment. Users may also specify, via the GUI tool 270, how the system is to respond to certain observed events and/or behaviors (for example, when to produce (or not produce) an alert). Note, while FIG. 2 shows the transaction server 260 as being separate from the machine learning engine 140, those skilled in the art will recognize that the transaction server 260 may readily be integrated as part of the machine learning engine 140.

Figure 3:
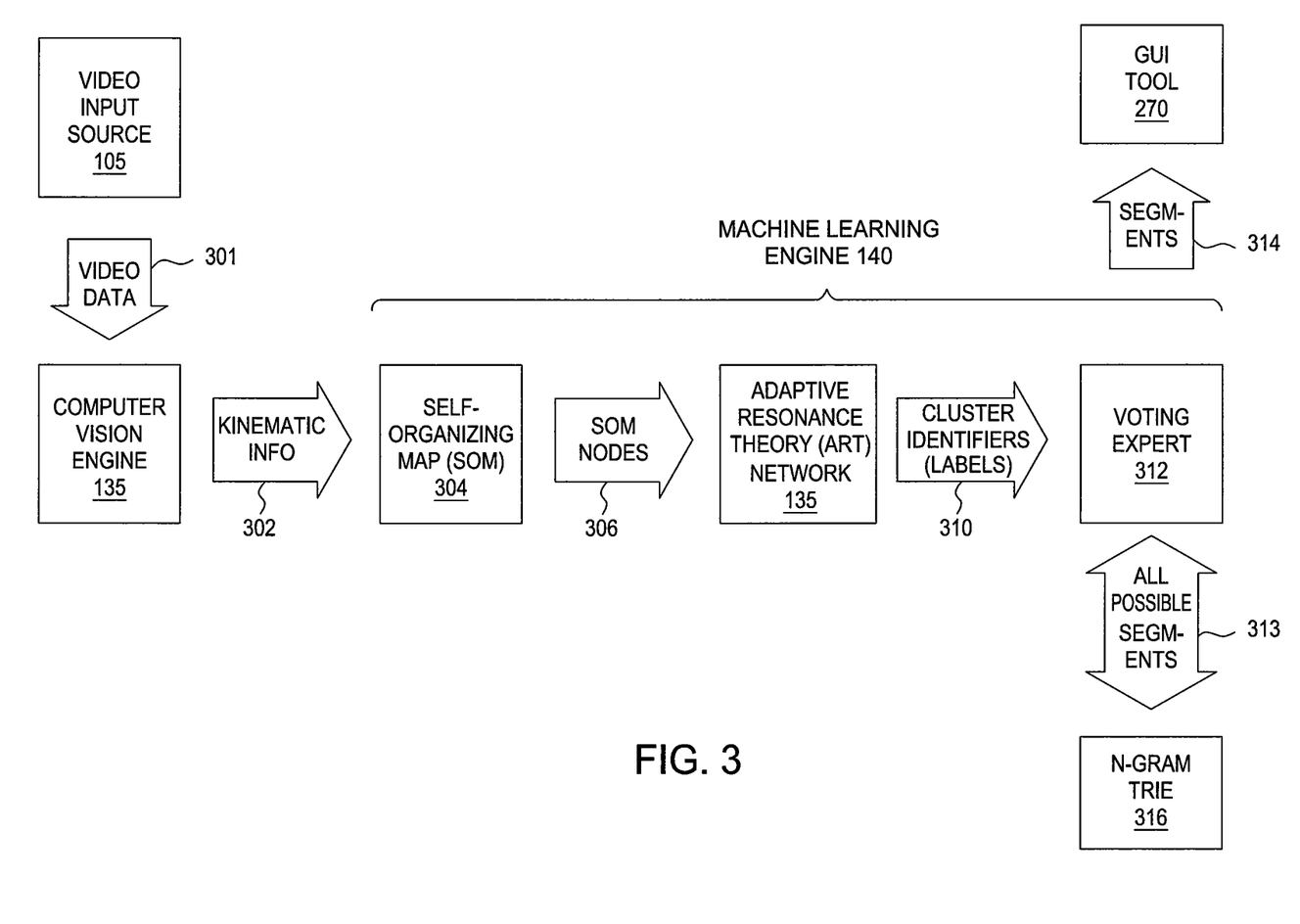
FIG. 3 illustrates a data flow of the video analysis and behavior-recognition system, according to one embodiment of the invention.

FIG. 3 illustrates a data flow 300 of the computer system 115 of FIG. 1, according to one embodiment of the invention. As shown, the data flow includes the video input source 105, the computer vision engine 135, the machine learning engine 140, and the GUI tool 270. In one embodiment, the video input source 105 may record and send video data 301 to the computer vision engine 135. The computer vision engine 135 may then send kinematic information 302 to the machine learning engine 140. The kinematic information 302 may include data describing objects detected in a scene by the computer vision engine 135. Specifically, the kinematic information 302 may include dynamic and kinematic characteristics of an object (e.g., time, position, velocity, etc.), identification information, classification information, object trajectories, and so on. Further, the kinematic information 302 may be received in a generally real-time stream as the computer vision engine 135 processes a video stream, frame-by-frame. The kinematic information 302 may include kinematic points, each kinematic point representing properties of the foreground object observed at a different point in time. For example, each kinematic point may include a position, current (and projected) trajectory, direction, orientation, velocity, acceleration, size, and color of the foreground object at a rate of 5 Hz (i.e., the computer vision engine 135 may output kinematic information 302 for each observed object in a scene at a rate of 5 times per second).

In one embodiment, the machine learning engine 140 may include a self-organizing map (SOM) 304. The machine learning engine 140 may supply each kinematic point as an input vector to the SOM 304. For example, a six-dimensional input vector may be supplied that includes: (i) a height in pixels of the foreground object; (ii) a width in pixels of the foreground object; (iii) a velocity in the horizontal direction of the foreground object; (iv) a velocity in the vertical direction of the foreground object; (v) an x-coordinate of the foreground object in the frame; and (vi) a y-coordinate of the foreground object in the frame. As is known, a SOM provides an artificial neural network trained using unsupervised learning to produce a low-dimensional, discretized representation of a higher-dimensional input space of training samples. The discretized representation is called a map and is typically two-dimensional. Thus, the SOM allows high-dimensional data to be visualized. Further, like many artificial neural networks, SOMs operate in two modes: training and mapping. Training builds the map using sample vector inputs. Mapping automatically assigning new input vectors to a node of the SOM.

A SOM includes nodes, each node occupying a distinct position in the map. Further, each node includes a weight vector of the same dimension as the input vectors. The nodes may typically be arranged in an evenly spaced fashion and in a hexagonal or rectangular grid. The SOM maps data from a higher dimensional input space to a lower dimensional map space. For each input vector, the SOM identifies a node having the closest weight vector. The closest weight vector may be identified by computing a Euclidean distance between the input vector and the weight vector. Once identified, the SOM may assign distinct position (i.e., coordinates) of the node in the map to the input vector. The SOM may also adjust the weight vector of the node (and weight vectors of neighboring nodes within a given radius of the node) based on the mapped input vector. The SOM may also decrease the radius over time (as input vectors are mapped).

In one embodiment, the machine learning engine 140 may also include an Adaptive Resonance Theory (ART) network 308. Upon each input vector mapping to a node in the SOM 304 (i.e., for each adjustment of the SOM 304), the machine learning engine 140 may supply the SOM 304 to the ART network 308. As is known, Adaptive Resonance Theory describes a number of neural network models which use supervised and unsupervised learning methods. In one embodiment, the ART network 308 generates clusters from the nodes of the SOM 304. Each cluster represents a statistical distribution of a specific mix of kinematic properties (e.g., velocity and position) of nodes of the SOM 304 which are perceived by the ART network 308. Further, the ART network 308 may assign an arbitrary identifier (or symbol) to each cluster. In one embodiment, the ART network 308 may be configured to provide dynamic clustering. That is, a cluster in ART network 308 may change in size/shape as each set of SOM nodes is mapped to that cluster. A cluster may initially be defined as a relatively small size. However, as inputs are mapped to that cluster, the size may grow and change over time. Further, the clusters may decay over time. For example, if a cluster does not receive a set of SOM nodes (reinforcing the importance of that cluster) for a specified period of time, such a cluster may be removed from an ART network 308.

In one embodiment, the machine learning engine 140 may include voting experts 312. As used herein, a "voting expert" refers to an application configured to partition a sequence of symbols into subsequences—referred to as segments. Voting Experts generally refers to an unsupervised algorithm for finding chunks in sequences (i.e., segmenting a sequence). A chunk refers to a grouping of symbols of clusters, such that entropy within the grouping is relatively low, while entropy at boundaries of the grouping (i.e., between the grouping and adjacent labels) is relatively high. In this respect, a chunk may be said to exhibit an information theoretic "signature" (by which the chunk may be identified). Entropy between two labels refers to a measure of familiarity, i.e., how often the two labels have been observed to occur. Suppose Voting Experts is supplied with text from an English novel, with spaces and all forms of punctuation removed. Voting Experts may determine how to find chunks (i.e., words in the English language) in what appears to Voting Experts to be just a stream of characters (i.e., the text from the English).

In one embodiment, upon receiving clusters from the ART network 308 for each input vector mapping to a node in the SOM 304, the machine learning engine 140 identifies the cluster for the node that the respective input vector maps to. The machine learning engine 140 supplies an identifier (or label) for the cluster to the voting experts 312. That is, as the SOM 304 assigns input vectors to nodes of the map and self-adjusts (for example, at a rate of five Hertz, or five input vectors per second), the ART network 308 clusters nodes of each adjusted SOM 304, and the machine learning engine 140 supplies a sequence of labels 310 (of clusters) to the voting experts 312 (for example, at a rate of five labels per second).

Like finding words in a stream of characters, the voting experts 312 may find segments 314 in a stream of labels 310, based on the entropy present in the sequences. For instance, in the parking scenario described above, the voting experts 312 may identify, from a stream of labels 310 (assigned, e.g., to ART network clusters), a first segment that includes labels corresponding to the car pulling up and parking (e.g., "vehicle appears," "vehicle slowing," and "vehicle stops"). The voting experts 312 may also identify a second segment that includes labels corresponding to the driver exiting the car and walking (e.g., "human appears," "human starts," and "human moving"). Specifically, the voting experts 312 may compute entropy values from a sequence of all labels 310 thus far received by the voting experts 312. That is, the voting experts 312 may determine all possible segments 313 of the sequence. The voting experts 312 may store the all possible segments 313 in an n-gram trie 316.

As is known, an n-gram is a subsequence of n items from a given sequence. The items in question may be phonemes, syllables, letters, words, etc. Generally, an "n-gram model" is a type of probabilistic model for predicting the next item in a sequence. Further, a "trie" (or prefix tree) is an ordered tree data structure that stores an associative array where keys of the associative array are typically strings. An associative array is an abstract data type composed of a collection of unique keys and a collection of values, where each key is associated with one or more values.

Once all possible segments (based on the observed inputs sequence up to a depth of n) are stored in the n-gram trie 316, the voting experts 312 may determine frequencies and probabilities for each n-gram (i.e., for each possible segment). The voting experts 312 may also determine, based on the frequencies and probabilities, how to partition subsequently observed sequences of labels 310 into segments 314. Further details of the Voting Experts 312 are described in co-pending U.S. patent application Ser. No. 12/543,379, filed Aug. 18, 2009, titled "Adaptive Voting Experts for Incremental Segmentation of Sequences with Prediction in A Video Surveillance System," by Cobb, et al., which is herein incorporated by reference in its entirety.

For instance, in the scenario of the picnic table described above, the voting experts 312 may partition the sequence into a first segment and a second segment. The first segment may include labels (of clusters) corresponding to the person walking to the picnic table (e.g., "human appears," "human moving," and "human stops"). The second segment may include labels corresponding to the person leaving the picnic table (e.g., "human starts," "human moving," and "human disappears"). Further, the voting experts 312 may integrate each (partitioned) segment into the n-gram trie 316. If a partitioned segment is anomalous, the machine learning engine 140 may generate an alert for the partitioned segment. From the partitioned segments, the machine learning engine 140 may more accurately determine whether each segment of a newly received sequence is anomalous—by comparing the probabilities of observing a sequence (or segment) as represented by the ngram trie 316 to the actual observations. For events that have a probability falling below a specified threshold, alerts may be generated. For example, alerts may be generated for an intra-sequence anomaly (i.e., when a low probability sequence is observed) and for inter-sequence anomalies (i.e., when two different sequences interact with one another).

In one embodiment, the GUI tool 270 and the transaction server 260 allow users to retrieve and generate visualizations of sequences (generated by the SOM-ART) and segments (generated by the voting experts). For example, the transaction server 260 may be configured to processes user requests from the GUI tool 270 to generate and display a visualization of a segment. Table I shows examples of transactions that may be supported by the transaction server 260:

TABLE I

Transactions supported by the transaction server 260

| Transaction | Description |
| --- | --- |
| Get preset list | Obtain a list of presets for a specified camera |
| Get scene image | Obtain a picture that represents a scene as viewed by the camera |
| Get segments, ART labels, and SOM nodes | Obtains all learned data for a specified preset (e.g., including properties) |
| Set always alert | Specifies to always alert on event(s) matching a specified segment |
| Set always ignore | Specifies to never alert on event(s) matching a specified segment |
| Modify property | Modify a specified property of a segment |

Figure 4:
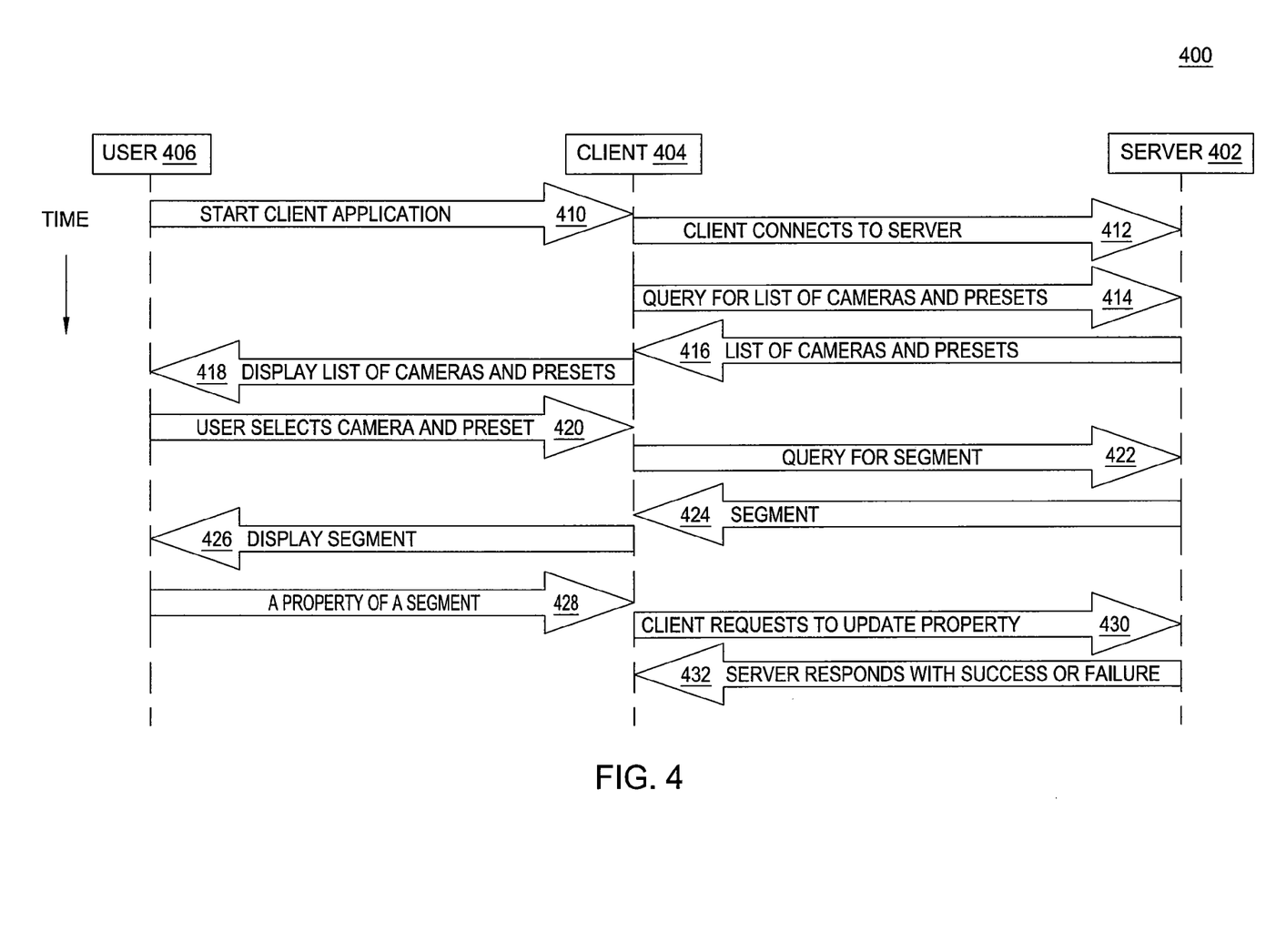
FIG. 4 illustrates a sequence of interactions between a transaction server and a client, according to one embodiment of the invention.

FIG. 4 illustrates a sequence of interactions between the transaction server 260 and a client 404 performed to provide a user 406 with a visualization of a segment, according to one embodiment of the invention. In one embodiment, the transaction server 260 may listen for client requests on a specified port (e.g., via the Berkeley sockets application programming interface (API) over Transmission Control Protocol/Internet Protocol (TCP/IP)). Further, the client 404 and the transaction server 260 may communicate using any application-layer network protocol such as Hypertext Transfer Protocol (HTTP), File Transfer Protocol (FTP), Simple Object Access Protocol (SOAP), etc. Further still, each request to and/or response from the transaction server 260 may be in a standard format such as Extensible Markup Language (XML).

As shown, the method 400 begins at step 410, where the user 406 invokes the client 404. At step 412, a user interacts with the client 404 to connect to the transaction server 260. For example, the client 404 may connect to a specified IP address and port number on which the transaction server 260 is listening. At step 414, the client 404 queries for a list of cameras and associated presets 416. Each preset may include a location and orientation of a video camera observing (or having observed) a scene. At step 416, the transaction server 260 returns a list of cameras and presets to the client 404. At step 418, the client 404 displays the list of cameras and presets to the user 406.

At step 420, the user 406 selects a camera and a preset. The client 404 then queries for a list of segments, ART labels, and SOM nodes from the server 402 for the selected camera and preset (step 422). At step 424, the server 402 returns the list of segments, ART labels, and SOM nodes to the client 404. Alternatively, the server 402 may be configured to return a list of segments for a currently active scene being observed by the computer vision engine 135 and machine-learning engine 140. At step 426, the client 404 displays the list of segments to the user 406. The user 406 may select a segment from the list. The client 404 may then display properties associated with the selected segment. The properties may include an identifier for the segment, a label for the segment, alert preferences for the segment, etc. The client 404 may also allow the user 406 to modify one or more properties for a segment. For example, a user 406 may modify a label for a segment to customize how the GUI tool 270 conveys information for the segment.

At step 428, the user 406 modifies a property of a segment via the client 404. At step 430, the client 404 sends a request to the server 402 to update the property of the segment. At step 432, the server 402 attempts to update the property of the segment and returns a result to the client 404 indicating success or failure of the attempted update. After the step 432, the method 400 terminates. The client 404 may also continue to interact with the server (e.g., via the steps 414, 422, or 430).

Figure 5:
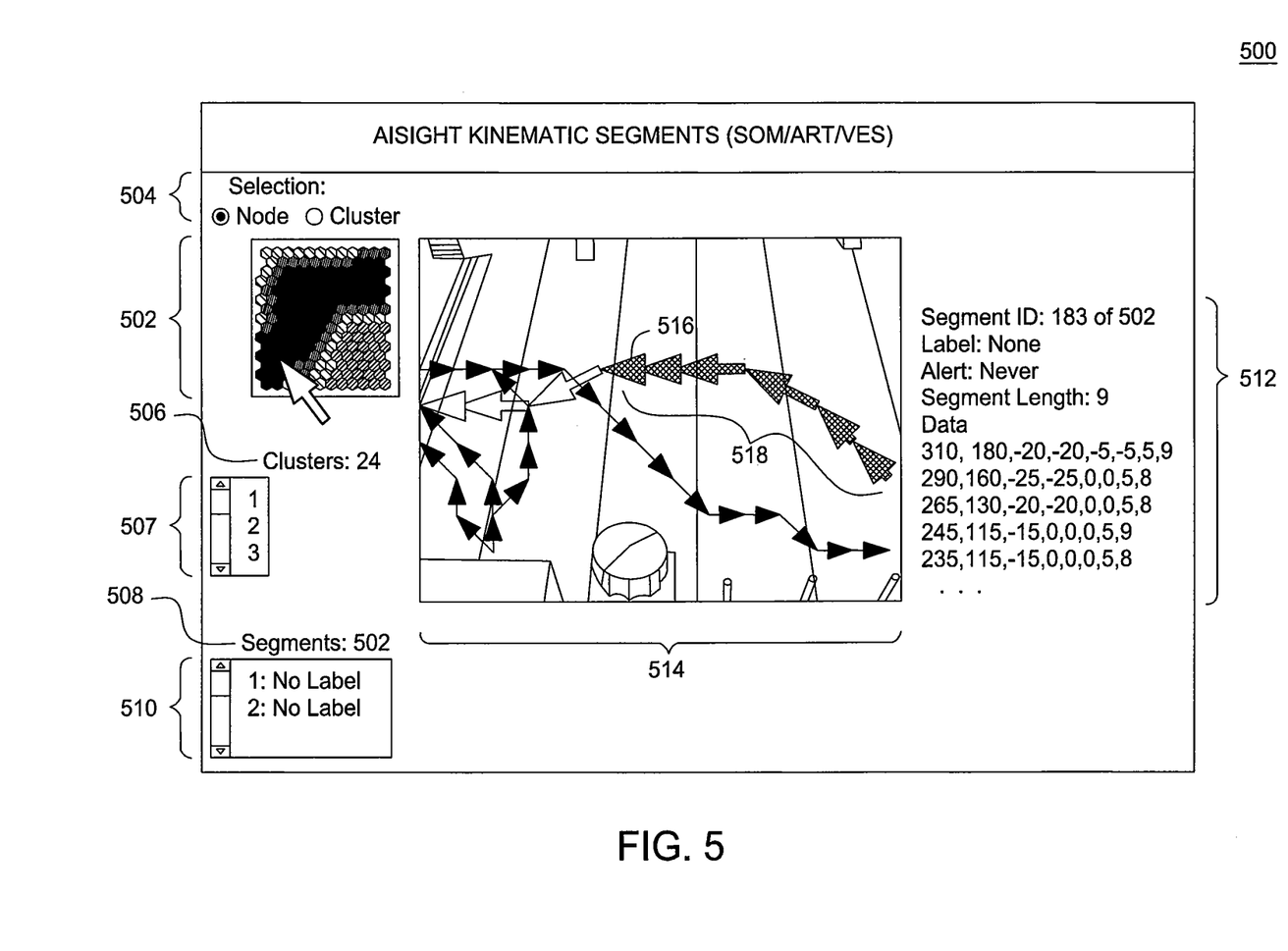
FIG. 5 illustrates a graphical user interface (GUI) conveying a segment, according to one embodiment of the invention.

FIG. 5 illustrates a graphical user interface display (GUI) 500 presenting a visualization of a segment from the machine learning engine 140, according to one embodiment of the invention. As shown, the GUI 500 includes a visualization 302 of a SOM, radio buttons 504 for specifying whether to select a SOM node or a cluster of SOM nodes, a count 506 of clusters, a list 507 of clusters, a count 508 of segments, a list 510 of segments, properties 512 of a segment, and a visualization 514 of a segment.

As shown, the visualization 302 of the SOM arranges each node of the SOM in an evenly spaced fashion and in a hexagonal grid. Further, each node may be shaded to indicate which cluster the node belongs to (i.e., as classified by the ART network). A user may specify, via the radio buttons 504, whether to select a SOM node or a cluster of SOM nodes, according to one embodiment. As shown, the radio buttons 504 indicate that a SOM node (rather than a cluster) is to be selected. A user may click on any SOM node in the visualization 302 of the SOM to select the SOM node. Alternatively, if the radio buttons 504 indicate that a cluster of SOM nodes is to be selected, clicking on any SOM node in the visualization 302 of the SOM may select the cluster to which the SOM node belongs. That is, clicking the SOM node may select all SOM nodes belonging to the cluster (as classified by the ART network).

In one embodiment, upon receiving user input selecting a SOM node, the GUI tool 270 displays a visualization 514 of the SOM node. Because a SOM node includes a weight vector that represents kinematic data such as position, velocity, size, and acceleration of foreground objects observed in a scene, the visualization 514 may be derived from the weight vector of the SOM node. The GUI tool may superimpose the visualization 514 over a background model representing the scene, according to one embodiment. In particular, the GUI tool may visually distinguish a segment 518 from a sequence 516 (e.g., by color). For example, in the scenario of the picnic table previously described, the segment corresponding to the person walking to the picnic table may be set apart from the sequence corresponding to the person walking to the picnic table, smoking, and leaving the picnic table.

Aside from selecting a cluster by clicking on the SOM, a user may also select a cluster from the list 507 of clusters, according to one embodiment. Further, a user may navigate through the list 507 of clusters (e.g., using arrow keys of a keyboard or using a scroll bar for the list 507 of clusters). Upon receiving user input selecting a cluster (e.g., from the list 507 of clusters or from the SOM 502), the GUI tool 270 may highlight, in the visualization 302 of the SOM, SOM nodes belonging to the cluster. Further, the GUI tool may also display a visualization 514 of the SOM nodes belonging to the cluster. The visualization 514 may be derived from the weight vectors of the SOM nodes belonging to the cluster. Specifically, the GUI tool may display a visualization of each SOM node belonging to the cluster. The GUI tool may also display a visualization of a statistical average of all SOM nodes belonging to the cluster. The GUI tool 270 may distinguish the visualization of the statistical average from the visualizations of the SOM nodes (e.g., by color). The GUI tool may superimpose the visualizations over a background model representing the scene, according to one embodiment.

As shown, the count 506 of clusters indicates that the ART network classifies the nodes of the SOM into a total of twenty-four clusters. Further, the count 508 of segments indicates that the voting expert partitions a sequence of cluster identifiers (as described above, for nodes in each adjusted SOM that a foreground objects maps to) into a total of five hundred and two segments.

A user may select a segment from the list 510 of segments, according to one embodiment. Further, the user may navigate through the list 510 of segments (e.g., using arrow keys of a keyboard or using a scroll bar for the list 510 of segments). Upon receiving user input selecting a segment, the GUI tool 270 may display a visualization 514 of the selected segment. For example, GUI tool 270 may represent each cluster label of the segment using an arrow superimposed over a background model for the scene. The GUI tool 270 may determine the appearance of each arrow based on the respective cluster symbol. For example, the color of an arrow may represent a velocity of the object, while the size of an arrow may represent the size of the foreground object. Of course, the manner in which segments are visually represented may be adapted to suit the needs of a particular case.

In one embodiment, the GUI tool 270 may also display properties 512 of the selected segment. As shown, the properties 512 of the segment include an identifier for the segment, a symbol of the segment, whether to alert upon detecting behavior of a foreground object that matches the segment, a length of the segment, and other data for the segment. The user may supply or modify the symbol or label for the segment, according to one embodiment. Further, the user may also set the machine-learning engine 140 to alert (or not to alert) whenever the machine-learning engine determines that a series of events matching the segment has occurred.

Figure 6:
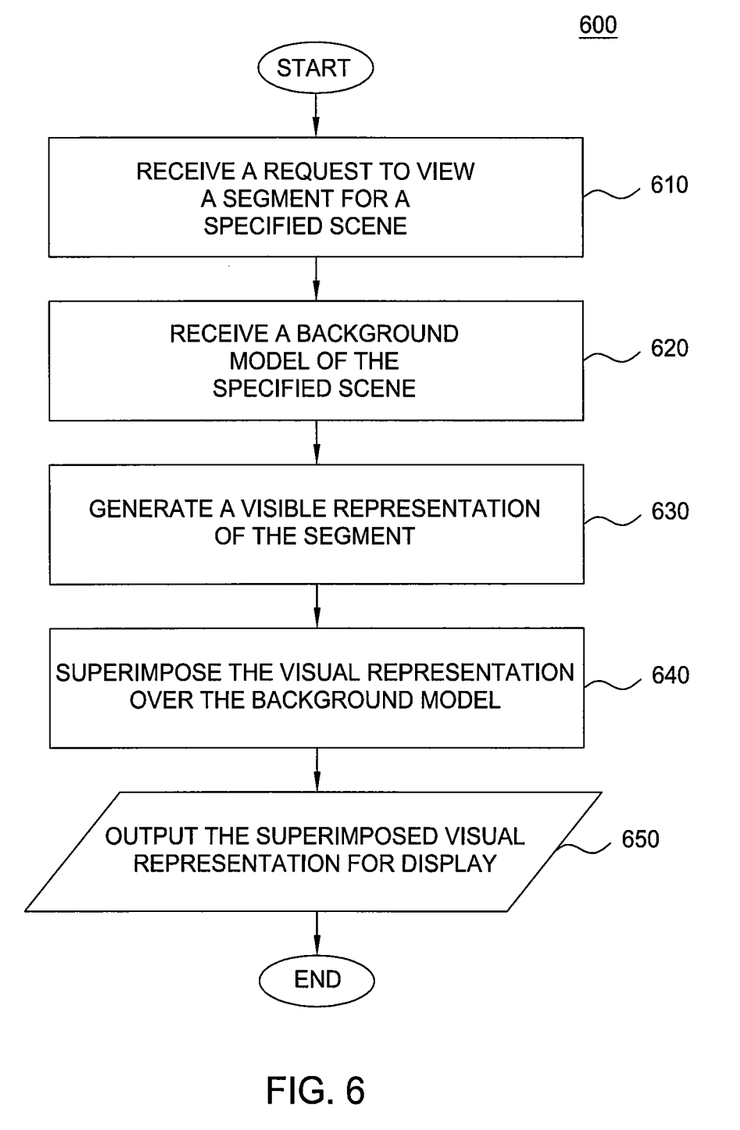
FIG. 6 illustrates a method for generating a visualization of a segment, according to one embodiment of the invention.

FIG. 6 illustrates a method 600 for generating a visual representation of a segment, according to one embodiment of the invention. As shown, the method 600 begins at step 610, where the transaction server 260 receives a request to view segments (or a sequence from which the segments are partitioned) for a specified scene. For example, a user may specify a camera and a preset for the camera for which the user desires to view the sequence. The user may then select a sequence from a list of sequences provided by the transaction server 260 for the specified camera and preset. At step 620, the transaction server 260 retrieves a background model of the scene. At step 630, the transaction server 260 retrieves the segment from the machine-learning engine 140. As discussed above, the machine-learning engine 140 may have derived the sequences through observation of data streams generated from computer vision engine itself observing a sequence of video frames depicting a scene captured by a video camera (e.g., the foreground objects may be supplied to an SOM-ART network and the resulting ART network cluster labels are sequenced using the voting experts approach. At step 640, the transaction server 260 generates a visual representation of the sequence. For example, the transaction server 260 (and/or the GUI tool 270) may generate, from kinematic data associated with the sequence, arrows superimposed over the background model of the scene. The arrow (or other visualization) of each symbol of the ordered string of symbols in the sequence may be superimposed at a position in the background image corresponding to a spatial location in the scene where the kinematic data associated with the respective symbol was obtained Further, the GUI tool 270 may be configured to allow the user to view and/or modify properties of any segment selected by the user. At step 640, the transaction server 260 may output the visual representation for display. After step 640, the method 600 terminates.

Figure 7:
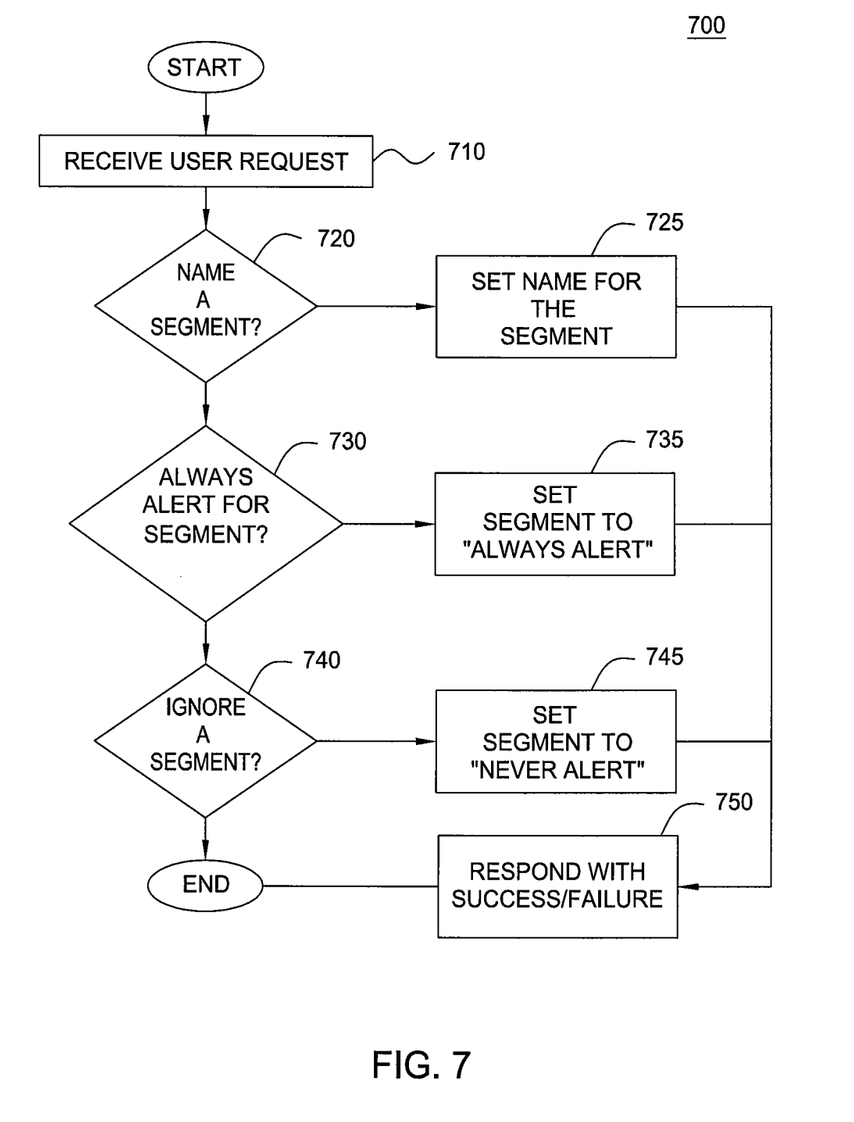
FIG. 7 illustrates a method for modifying properties of a segment, according to one embodiment of the invention.

FIG. 7 illustrates a method 700 for modifying properties of a segment, according to one embodiment of the invention. As shown, the method 700 begins at step 710, where the transaction server 260 receives a user request to modify a property of the segment. If the user request is to name a segment (step 720), the transaction server 260 may set the name for the segment (step 725). If the user request is to always alert for a segment (step 730), the transaction server 260 may set the machine-learning engine 140 to always alert upon observing behavior of a foreground object that matches the segment (step 735). If the user request is to ignore a segment (step 740), the transaction server 260 may set the machine-learning engine 140 to never alert when a series of primitive events matching the segment is observed (step 745). Further, the user may also request to modify other properties associated with a segment. After the steps 725, 735, or 745, the transaction server 260 may respond with a success or failure of servicing the user request (step 750). After the steps 740 or 750, the method 700 terminates.

Advantageously, embodiments of the invention provide users with a visualization of data observed by a machine-learning engine of a behavior recognition system. Further, the visualization may provide an interface used to guide system behavior. In one embodiment, a GUI tool allows a user to visualize and manipulate segments derived by a video surveillance system. For example, users may specify that observations that match an existing segment is to always (or never) result in an alert. Further, the GUI tool may allow users to modify other various properties associated with a segment, including semantic labels used to name the segment.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a request to view a sequence storing an ordered string of symbols, wherein the sequence is generated from kinematic data derived from analyzing an input stream of video frames depicting one or more foreground objects and wherein the sequence is partitioned into one or more segments using by a collection of voting experts configured to vote positions within the sequence at which to partition the sequence into the one or more segments;
retrieving a background image associated with a scene depicted in the input stream of video frames;
generating a visual representation of the requested sequence; and
superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

2. The computer implemented method of claim 1, wherein the request to view the sequence is a request to view one or more of the partitioned segments.

3. The computer-implemented method of claim 1, wherein each symbol in the string of symbols corresponds to a cluster in an adaptive resonance theory (ART) network.

4. The computer-implemented method of claim 3, wherein the string of symbols is generated by mapping the kinematic data for a first foreground object detected in the input stream of video frames to nodes of a self-organizing map (SOM) and wherein the ART network clusters resulting nodes in the SOM.

5. The computer-implemented method of claim 1, wherein the background image specifies a pixel value expected to be observed by the video camera for each pixel in a frame of video when scene background is visible to the video camera.

6. The computer-implemented method of claim 1, further comprising:
receiving, as user input, a property to associate with the requested sequence, wherein the property is selected from at least: (i) a label to assign to the sequence; (ii) an indication to generate an alert message each time the sequence is subsequently observed; and (iii) an indication to not generate an alert message any time the sequence is subsequently observed.

7. A computer-readable storage medium containing a program, which when executed on a processor, performs an operation, comprising:
receiving a request to view a sequence storing an ordered string of symbols, wherein the sequence is generated from kinematic data derived from analyzing an input stream of video frames depicting one or more foreground objects and wherein the sequence is partitioned into one or more segments using by a collection of voting experts configured to vote positions within the sequence at which to partition the sequence into the one or more segments;
retrieving a background image associated with a scene depicted in the input stream of video frames;
generating a visual representation of the requested sequence; and
superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

8. The computer-readable storage medium of claim 7, wherein the request to view the sequence is a request to view one or more of the partitioned segments.

9. The computer-readable storage medium of claim 7, wherein each symbol in the string of symbols corresponds to a cluster in an adaptive resonance theory (ART) network.

10. The computer-readable storage medium of claim 9, wherein the string of symbols is generated by mapping the kinematic data for a first foreground object detected in the input stream of video frames to nodes of a self-organizing map (SOM) and wherein the ART network clusters resulting nodes in the SOM.

11. The computer-readable storage medium of claim 7, wherein the background image specifies a pixel value expected to be observed by the video camera for each pixel in a frame of video when scene background is visible to the video camera.

12. The computer-readable storage medium of claim 7, wherein the operation further comprises:
receiving, as user input, a property to associate with the requested sequence, wherein the property is selected from at least: (i) a label to assign to the sequence; (ii) an indication to generate an alert message each time the sequence is subsequently observed; and (iii) an indication to not generate an alert message any time the sequence is subsequently observed.

13. A system, comprising:
a video input source configured to provide an input stream of video frames, each depicting a scene;
a processor; and
a memory containing a program, which, when executed on the processor is configured to perform an operation, comprising:
receiving a request to view a sequence storing an ordered string of symbols, wherein the sequence is generated from kinematic data derived from analyzing one or more foreground objects depicted in the input stream of video frames and wherein the sequence is partitioned into one or more segments using by a collection of voting experts configured to vote positions within the sequence at which to partition the sequence into the one or more segments,
retrieving a background image associated with a scene depicted in the input stream of video frames,
generating a visual representation of the requested sequence, and
superimposing the visual representation of the requested sequence over the background image, wherein the position of each symbol of the ordered string of symbols in the sequence is superimposed at a position in the background image corresponding to a spatial location in the scene where the kinematic data associated with the respective symbol was obtained.

14. The system of claim 13, wherein the request to view the sequence is a request to view one or more of the partitioned segments.

15. The system of claim 13, wherein each symbol in the string of symbols corresponds to a cluster in an adaptive resonance theory (ART) network.

16. The system of claim 13, wherein the string of symbols is generated by mapping the kinematic data for a first foreground object detected in the input stream of video frames to nodes of a self-organizing map (SOM) and wherein the ART network clusters resulting nodes in the SOM.

17. The system of claim 13, wherein the background image specifies a pixel value expected to be observed by the video camera for each pixel in a frame of video when scene background is visible to the video camera.

18. The system of claim 13, wherein the operation further comprises:

receiving, as user input, a property to associate with the requested sequence, wherein the property is selected from at least: (i) a label to assign to the sequence; (ii) an indication to generate an alert message each time the sequence is subsequently observed; and (iii) an indication to not generate an alert message any time the sequence is subsequently observed.

\* \* \* \* \*

UNITED STATES PATENT AND TRADEMARK OFFICE
CERTIFICATE OF CORRECTION

PATENT NO. : 8,493,409 B2
APPLICATION NO. : 12/543351
DATED : July 23, 2013
INVENTOR(S) : Cobb et al.

Page 1 of 1

It is certified that error appears in the above-identified patent and that said Letters Patent is hereby corrected as shown below:

In the Claims:

Column 19, Claim 16, Line 9, delete "13" and insert --15-- therefor.

Signed and Sealed this
Twenty-sixth Day of November, 2013

Margaret A. Focarino
*Commissioner for Patents of the United States Patent and Trademark Office*